United States Patent [19]

Bowser et al.

[11] 3,930,888

[45] Jan. 6, 1976

[54] MOLTEN METAL ANODE

[75] Inventors: George C. Bowser, Baltimore, Md.; James R. Moser, deceased, late of Shrewsbury, Pa., by Patricia Karen Moser, administratrix

[73] Assignee: Catalyst Research Corporation, Baltimore, Md.

[22] Filed: Mar. 17, 1975

[21] Appl. No.: 558,733

Related U.S. Application Data

[62] Division of Ser. No. 360,162, May 14, 1973, Pat. No. 3,891,460.

[52] U.S. Cl. .......................... 136/120 R; 136/83 T
[51] Int. Cl.² .......................................... H01M 4/06
[58] Field of Search......... 136/83 T, 83 R, 6 FS, 20, 136/120 R, 146

[56] References Cited
UNITED STATES PATENTS

| 3,425,872 | 2/1969 | Levy | 136/83 R |
| 3,667,822 | 7/1972 | Bush | 136/83 T |
| 3,669,748 | 6/1972 | McCullough et al. | 136/83 T |
| 3,704,221 | 11/1972 | McCulley | 136/146 X |
| 3,723,183 | 3/1973 | Greatback | 136/83 R |
| 3,773,557 | 11/1973 | Mead | 136/83 R X |
| 3,891,460 | 6/1975 | Bowser et al. | 136/83 T |

Primary Examiner—Howard S. Williams
Assistant Examiner—C. F. Lefevour

[57] ABSTRACT

Improved thermal batteries operating at elevated temperatures include a molten metal anode in which a foraminous substrate is filled with the anode metal and contained in a housing having an impervious metal portion and a porous refractory fiber portion, the porous portion being in sealing engagement against the metal portion.

12 Claims, 6 Drawing Figures

MOLTEN METAL ANODE

This is a division of application Ser. No. 360,162 filed May 14, 1973 now U.S. Pat. No. 3,891,460.

BACKGROUND OF THE INVENTION

Thermal cells are primary electrochemical cells having an anode, a cathode and an electrolyte that is solid and non-conductive at normal temperatures. The cell is activated by providing sufficient heat to melt the electrolyte which thereby becomes conductive. Thermal batteries are made up of a plurality of thermal cells and conventionally also include a heat source, usually an ignitable, exothermically reactive chemical charge or pyrotechnic.

A variety of electrochemical systems are known for use in thermal cells. The electrolytes are generally mixtures of alkali metal halides, most commonly a eutectic mixture of LiCl and KCl melting at about 352°C., although other fusible salt mixtures have been used, such as alkali metal thiocyanates. Suitable active cathode materials that are reduced in the electrochemical cell reaction, often called depolarizers, include phosphates, metal oxides, borates and chromates, the most widely used being calcium chromate or vanadium pentoxide. In many batteries the electrolyte is supported on glass or ceramic fiber tape or felt and the depolarizer is applied as a glaze or paste to a metallic cathode current collector, as by O. G. Bennett and John P. Wooley in U.S. Pat. No. 3,575,714. It is now common practice to mix the electrolyte and depolarizer with a binder in powder form and press the mixture into a wafer, generally referred to as a DEB pellet, as is disclosed, for example, by D. M. Bush in U.S. Pat. No. 3,677,822, S. C. Levy in U.S. Pat. No. 3,425,872 or R. P. Clark and Kenneth R. Grothaus in U.S. Pat. No. 3,527,615.

Calcium is the most widely used anode material, generally in the form of a coating on a nickel or iron current collector, although magnesium is sometimes used and other anodes have been investigated, including solid lithium alloys. Richard E. Panzer in U.S. Pat. No. 3,367,800 discloses the use of a solid lithium anode, in which the cell temperature does not exceed the melting point of the anode. Even small amounts of liquid metal, such as lithium-calcium alloy formed during operation of cells having a calcium anode and a lithium containing electrolyte, result in internal shorting which is a principle mode of failure in thermal batteries, as is pointed by Clark and Grothaus, supra. Various techniques have been used to inhibit liquid alloy formation, while E. M. Klopp and Terrence J. Kurtzweill in U.S. Pat. No. 3,533,844 have used individually sealed cells having a screen barrier adjacent a calcium anode to retain such alloy by capillary action.

Conventional thermal cells, such as the calcium/lithium chloride-potassium chloride/calcium chromate cells, also have disadvantages resulting from self-discharge reactions in which the cell components react chemically, rather than electrochemically, with no electrical power generation. One such disadvantage is that they rapidly deteriorate at operating temperature, even when connected in an open circuit. Another disadvantage is that they have a comparatively narrow operating temperature range of about 100 centigrade degrees and, when overheated, the heat generated by the self-discharge reaction further heats the cell to further accelerate the self-discharge reaction; this type failure is known as thermal runaway. Thermal runaway is an especially severe problem in larger battery sizes because it can be initiated by localized hot spots.

Another problem of great practical significance is the inability to accurately predict the performance of thermal batteries of various size and design as well as the extreme difficulty in obtaining high reproducibility.

SUMMARY OF THE INVENTION

It is an object of this invention to provide a liquid metal anode for use in thermal cells, which anode can be used in cells in the same manner as solid anodes have been used heretofore. Another object is to provide improved thermal batteries utilizing the liquid metal anode; such improved batteries provide higher energy density, higher power density and longer life than have been heretofore available in thermal batteries. Another object is to provide a thermal battery that can stand in an open circuit at operating temperature. Another object is to provide a thermal battery that is resistant to thermal runaway. Another object is to provide a thermal battery that is highly reproduceable and has predictable performance characteristics. Another object is to provide larger power batteries than have heretofore been practically obtainable from thermal batteries. Another object is to provide a thermal battery exhibiting substantially no "electrical noise", even at high power and energy densities.

In accordance with this invention the anode comprises a foraminous inert metal substrate wettable by and filled with an electrochemically active anode metal that melts at a temperature below the cell operating temperature and a housing having an impervious metal portion in electrical contact with the active anode metal and a porous refractory fibrous portion; the porous portion is in sealing engagement against the periphery of the metal portion. It is now preferred for use in long life batteries for the housing to completely envelope the active anode with the porous portion at least partly covering the anode surface that abuts the cell components with which it electrochemically reacts, which for purposes of convenience will be designated as the inner surface. The inner anode surface may be left uncovered for use in cells or batteries designed for short-lived operation. The batteries of this invention comprise a plurality of cells, each comprising an anode in accordance with this invention, an electrolyte, and a depolarizer cathode. The preferred batteries comprise a stack of cells in which there are stacked in recurring sequence an anode, a wafer containing electrolyte, depolarizer and binder, and a combustible composition that serves as a heat source and a cathode current collector. The batteries are activated by heating to a temperature above the melting point of the anode metal and the melting point of the electrolyte.

DESCRIPTION OF THE INVENTION

The active anode metals suitable for use in this invention include alkali metals, alkaline earth metals or alloys thereof that melt below the cell operating temperature, or, for most purposes, below about 400°C. It is now preferred to use lithium or an alloy of lithium and calcium as cells with such anodes provide higher voltage, power density and energy density.

The active anode metal is carried by a foraminous metal substrate that is wet by the molten anode metal and is substantially inert to electrochemical or other reaction in the particular cell system used. The substrate may be screens, fibrous pads, sintered metal, perforated sheets, or other foraminous form. Nickel, iron or stainless steel substrates are generally useable in the common thermal battery electrochemical systems; it will be recognized by those skilled in the art that other wettable metals may be used or that surface or other pretreatment may be used to improve wettability, such as, for example, as disclosed by Barry O. Hanawalt in U.S. Pat. No. 3,634,144 for wetting metals with lithium. The substrate is filled with active anode metal, most suitably by dipping the substrate in molten anode metal, withdrawing the substrate and then cooling it below the melting point of the anode metal. Although generally not preferred, the substrate may be filled in situ in the anode by, for example, abutting layers of substrate and anode metal; when the anode metal is melted on activation of the cell it will then wet and fill the substrate.

The anode housing comprises an impervious inert metal portion and a porous refractory fibrous portion. The metal portion is in electrical contact with the anode metal and may be of any solid metal substantially inert to the other cell components with which it may contact, most suitably nickel, stainless steel or iron. It is now preferred to use dry asbestos fibers, woven, felted or molded into the desired shape, as the porous portion of the housing. Any other insoluble, inorganic, non-metallic fibers of high melting point that is infusible during operation of the cell may be used in the place of the asbestos, such as, for example, refractory or ceramic fibers, either acidic, basic or amphoteric, mixtures of such fibers or mixtures of such fibers with asbestos. The porous portion of the housing is in tight engagement with the entire periphery of the metal portion of the housing, such sealing prevents leakage of the molten anode metal, along the metal housing surface to the exterior of the housing, that would cause shorting or other premature failure. It is recognized that there may be some reaction of the anode metal with such fibers, but this reaction appears over normal battery lives to be only a non-detrimental surface reaction; it is believed that this surface reaction at the fiber-metal interface prevents undesirable leakage of the anode metal from the anode assembly.

The invention is hereinafter more fully described with reference to the drawings.

Figure 1:
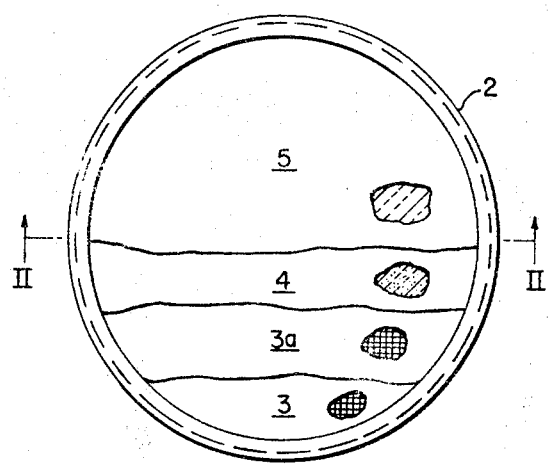
FIG. 1 is a plan view, partly cut away, of a preferred anode in accordance with this invention.
Figure 2:
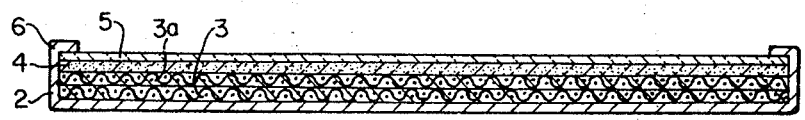
FIG. 2 is a cross section of FIG. 1 taken at A—A.

FIG. 1 and FIG. 2 illustrate a preferred embodiment in which the housing completely envelops the active anode. A shallow metal cup 2, generally formed from thin stock, suitably 5 to 10 mils, of an easily cold-formed metal, such as iron, carbon steel, stainless steel or nickel has a planar bottom and a sidewall perpendicular thereto. Screens 3 and 3a that are filled with solidified lithium and substantially cover the cup bottom, were prepared by dipping the screens in molten lithium as heretofore described. It will be recognized that filled screens so prepared contain only an amount of lithium that tends to be retained by the screen when in the molten state. We now prefer to use a 40 mesh screen of iron or type 304 stainless steel that carries up to about 0.25 grams of lithium per square inch when filled by dipping in molten lithium at about 500°C–600°C. One or more screens, pads or other layers of substrates are used to provide the amount of lithium desired in the anode. The porous portion of the anode housing is made up of two layers of asbestos fiber sheet 4 and 5 that overlie and cover the anode screens; inturned flange 6, integral with the top edge of the cup, overlaps and seals against the margin of sheet 5. Asbestos sheet 5 is impregnated with solidified salt corresponding to the electrolyte of the cell in which the anode is to be used and layer 4 is dry and unimpregnated. Satisfactory anodes can be made without an electrolyte impregnated layer, but it is generally desirable to provide such an electrolyte barrier for separating the anode metal and depolarizer to minimize self-discharge, especially in longer life batteries. The electrolyte barrier may be conveniently provided in other cell components when it is not included in the anode assembly.

Figure 3:
FIG. 3 is a cross sectional view of another anode embodying this invention.

In the anode assembly of FIG. 3 the housing likewise completely encloses the active anode. The outer surface of the active anode 22 abuts a solid metal disc 24 of larger diameter than the anode 22. An annulus 26 of asbestos sheet surrounds the active anode and engages the margin of the metal disc. An asbestos sheet 28 covers the inner surface of the electrode. When incorporated in a battery, the compression applied to the cell stack maintains the tight engagement of the assembly.

Figure 4:
FIG. 4 is a cross sectional view of another anode embodying this invention.
Figure 5:
FIG. 5 is a cross sectional view of another anode embodying this invention.

FIG. 4 and FIG. 5 illustrate modified anode assemblies in which the inner surface of the anode, that when assembled in a cell abuts other active electrochemical cell elements, is not covered. These assemblies are suitable for use in short-life batteries designed for operation for about two minutes or less. Referring to FIG. 4, the active anode 30 abuts a metal disc 32 and is surrounded by an asbestos sheet annulus 34. When incorporated in a compressed cell stack, the annulus is held in tight engagement against the disc.

FIG. 5 is similar to FIG. 2 in that the anode 36 is contained in a cup 38. Even though the inner anode surface is exposed, it is necessary to seal asbestos ring 40 against the entire edge of the metal cup.

Figure 6:
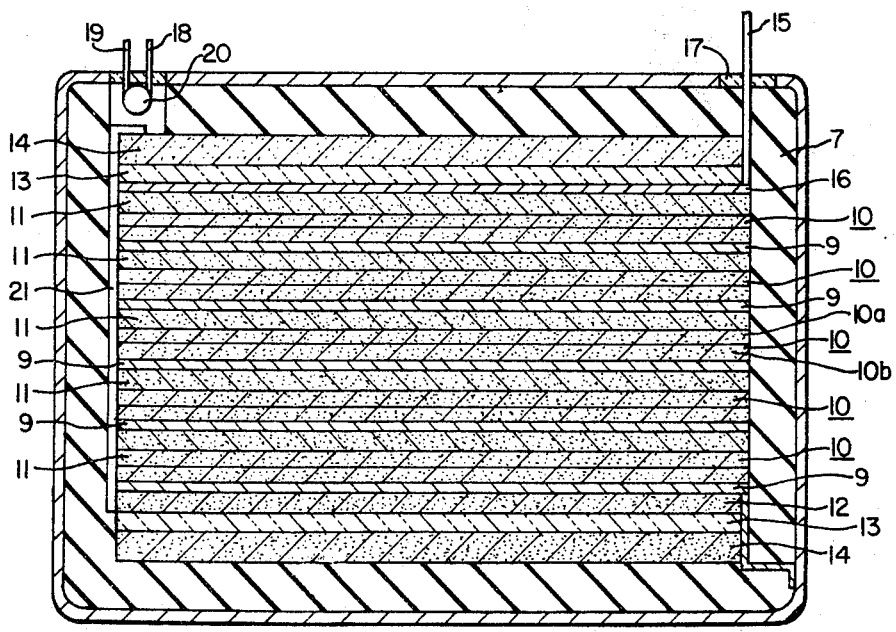
FIG. 6 is a cross sectional view of a thermal battery embodying this invention.

Referring to FIG. 6 the improved thermal batteries of this invention include a plurality of stacked electrochemical cell elements, each being in the shape of a thin disc or wafer together with an ignitable chemical heat source. The cell stack is surrounded by thermal and electrical insulation 7 and is maintained under compression by a metal housing 8. Each cell has an anode 9 in accordance with this invention, an electrolyte, a depolarizer and a cathode current collector. In the now preferred batteries, the electrolyte and depolarizer are incorporated in a two-layer anolyte/catholyte wafer 10; the combustible composition pellet 11 also serves as a cathode current collector and provides electrical connection between the cells. A combustible composition pellet 12 provides heat to the outside of the bottom cell of the cell stack. Asbestos disc 13 positioned on the ends of the cell stack serves as a temperature buffer. Additional heating is provided by combustible composition 14. Positive terminal 15 connected to metal current collector 16 extends through the insulation and housing, suitably sealed by glass or ceramic seal 17. Leads 18 and 19, also hermetically sealed, are connected to an electrical source for firing the electrical match or squib 20 to activate the battery. The electrical match ignites the fuse strip 21, which in turn ignites each wafer of combustible material.

The wafer 10 is a mixture of electrolyte, depolarizer and binder which is mixed in powder form and compacted into two layer wafer or pellet, now commonly known in the art as a two layer anolyte/catholyte pellet. The anolyte layer 10a is a mixture of an inorganic absorbent powdered binder with an electrolyte, which may be a single salt or a mixture of salts having melting points applicable to the desired cell operating temperature and that, for the most part, do not undergo reactions, other than electrochemical, with other cell components during storage or operation of the cell. Commonly, it is preferred to use a low melting mixture of alkali metal halides, most usually lithium chloride-potassium chloride eutectic. The catholyte layer 10b is composed of any thermally stable oxidizing material reducible by the anode that is suitable for use as a depolarizer, including those materials heretofore used as depolarizers for calcium, magnesium, lithium alloy and other thermal battery electrodes, such as, for example, potassium dichromate ($K_2Cr_2O_7$), calcium chromate ($CaCrO_4$), vanadium pentoxide ($V_2O_5$), and tungstic oxide ($WO_3$) and generally contains some electrolyte.

The combustible heat generating wafers are readily ignitable, electrically conductive after ignition and produce substantially no gas or burning. An example of such a known material is a mixture of iron and potassium perchlorate, suitably containing from about 84 to 90% iron.

The new anode is useable in other thermal battery constructions and arrangements in place of other solid electrodes. For example, there may be used in place of the two layer anolyte catholyte wafer in FIG. 3, a mixture of electrolyte depolarizer and binder compacted into a homogeneous wafer commonly known as a DEB pellet. Or a metal cathodic current collector may be used adjacent a depolarizer in cells electrically connected by metallic leads, in which case the combustible composition need not be conductive after ignition.

Batteries utilizing the new anode in place of prior solid anodes provide increased energy density, increased power density, longer life and less temperature sensitivity. In addition, the voltage regulation is improved, noise is substantially reduced, and the performance of the batteries is predictable and reproduceable. Even though the active anode is entirely liquid metal and the liquid metal is electrochemically available for reaction, the battery is substantially free from failure by internal shorting.

Illustrative of the improvement, the calcium/LCl-KCl/calcium chromate cell has a practical current density limit of about 0.4 amps per square inch (15 minute life), while energy densities as high as 2 amps per square inch are obtained when the new molten metal anode is used in place of calcium; the operating range with a calcium anode is between about 450°–570°C. while the range is between about 400°–650°C, with the molten metal anode; a typical calcium battery has an energy density of about 5 watt-hours per pound while with the molten metal anode energy densities of 10.4 watt-hours per pound or more may be obtained (the power density per cell is typically 34 watt-hours per pound or more when using lithium-containing anodes); the calcium anode batteries typically have a life of not more than 15 minutes, while the life of a battery with the new totally housed anode may be as long as 30 minutes. Similar improvements result when the new anode is used in other thermal battery systems. Although conventional solid electrode thermal batteries have not ordinarily been made larger than about 4 inches in diameter, the new molten metal anode batteries can be made up to 16 inches in diameter or larger and still provide reliable service. It is believed that the special adaptability for larger cells is realized because of the uniformity and improved heat transfer of the liquid metal anode.

The following examples are further illustrative of this invention. A 9-cell battery as in FIG. 6 was made using the anode of FIG. 1; an anolyte/catholyte wafer having an anolyte layer of Cab-O-Sil binder with a eutectic mixture of lithium chloride and potassium chloride and a catholyte layer of 3 parts by weight calcium chromate to one part by weight lithium chloride-potassium chloride; and a heat source containing iron and potassium perchlorate powders in the ratio of 21 parts to 4 parts by weight. Each cell was 5 5/16 inches in diameter and weighed 138.6 grams, including the heating wafer, which weighed 56 grams; each anode contained 220 to 230 mg. of lithium per square inch. On actuation by ignition of the heat source, the battery performance was as follows for the life until the output voltage dropped 22% below the initial voltage:

| | | |
|---|---|---|
| Discharge Load Resistance: | 0.80 | ohms |
| Energy Output: | 23,997 | coul. |
| Average Voltage: | 16.4 | |
| Average Current: | 20.5 | amps. |
| Running Time: | .333 | hours |
| Watt Hours per pound Cell (including Heat) | 34.6 | |
| Watt Hours per pound Battery | 10.36 | |
| Watt Hours per cubic inch cell | 7.7 | |
| Watt Hours per cubic inch battery | 0.96 | |

A 1 ⅜ inches diameter cell was made by stacking the anode of FIG. 4 containing about 65 mg. of lithium, an anolyte/catholyte pellet of the same composition as in the previous example, and an already burned heat wafer to simulate battery conditions. The cell was sandwiched between two iron disc current collectors with electrical leads attached. The cell thickness was 0.080 inches, including current collectors. The cells were activated by placing the cell under compression between heated platens. When such cells were heated to 512°C, the peak voltage under a constant load of 4.5 amperes ranged from 2.35 to 2.37 volts. The active life to 1.8 volts ranged from 59 to 79 seconds.

A 1 ⅜ inches diameter cell made as in the previous example except that the anode was that of FIG. 5 and contained about 135 mg. of calcium-lithium alloy. Such cells, activated by platens as above, give a peak voltage of 1.98 volts under a constant load of 4.5 amperes and had a life of 75 seconds to 1.8 volts and 100 seconds to 1.5 volts.

We claim:

1. An anode assembly for a heat activated battery comprising an anode having substantially parallel inner and outer surfaces and a side surface, said anode consisting essentially of a foraminous metal substrate wettable by and filled with a fusible metal selected from the group consisting of alkali metals, alkaline earth metals and alloys thereof melting below the operating temperature of the battery, and a housing covering the outer surface and side of said anode and consisting of an impervious metal portion in electrical contact with said anode and a porous portion in sealing engagement against the periphery of said metal portion and in contact with said anode, said porous portion being formed from refractory fibers.

2. An anode assembly according to claim 1 in which the porous portion is asbestos sheet.

3. An anode assembly according to claim 2 comprising a metal cup having a planar bottom and sidewall, the anode being contained within the cup, a porous sheet overlying and covering the anode inner surface, the cup having an inturned flange integral with its open end and overlapping the margin of the porous sheet.

4. An anode assembly according to claim 3 having a plurality of porous sheet layers, a layer spaced from the anode surface being impregnated with a fusible electrolyte.

5. An anode assembly according to claim 1 in which the housing envelops the anode, at least a portion of the anode inner surface being covered by the porous portion.

6. An anode assembly according to claim 5 in which the porous portion is asbestos sheet.

7. An anode assembly according to claim 5 having a plurality of porous layers, a layer spaced from the anode surface being impregnated with a fusible electrolyte.

8. An anode assembly according to claim 1 having a metal plate abutting and having a margin extending beyond the anode outer surface, and a porous annulus engaging the anode side surface and annulus.

9. An anode assembly according to claim 8 having a porous sheet covering the anode inner surface and annulus.

10. An anode assembly according to claim 1 in which the substrate is a plurality of screens.

11. An anode assembly according to claim 1 in which the metal is lithium.

12. An anode assembly according to claim 1 in which the metal is an alloy of calcium and lithium melting below about 400°C.

* * * * *

UNITED STATES PATENT OFFICE
CERTIFICATE OF CORRECTION

Patent No. 3,930,888          Dated January 6, 1976

Inventor(s) George C. Bowser et al.

It is certified that error appears in the above-identified patent and that said Letters Patent are hereby corrected as shown below:

The term of this patent subsequent to June 24, 1992, has been disclaimed.

Signed and Sealed this third Day of February 1976

[SEAL]

Attest:

RUTH C. MASON
*Attesting Officer*

C. MARSHALL DANN
*Commissioner of Patents and Trademarks*